United States Patent [19]

Goel

[11] Patent Number: 4,657,968

[45] Date of Patent: Apr. 14, 1987

[54] THERMOSETTING RESINOUS MOLDING COMPOSITIONS FOR PREPARING POLYURETHANE CONTAINING A PHOSPHOROUS POLYOL AND AN ESTEROL

[75] Inventor: Anil B. Goel, Worthington, Ohio

[73] Assignee: Ashland Oil, Inc., Ashland, Ky.

[21] Appl. No.: 863,263

[22] Filed: May 14, 1986

[51] Int. Cl.$^4$ .............................................. C08G 18/38
[52] U.S. Cl. .................................. 525/28; 252/182; 525/126; 525/131; 525/440; 525/455; 528/72; 528/75
[58] Field of Search ................. 525/28, 126, 131, 440, 525/455, 920; 252/182; 528/72, 75

[56] References Cited

U.S. PATENT DOCUMENTS 4,374,229  2/1983  Dunnavant et al. ................ 525/440

Primary Examiner—Maurice J. Welsh
Attorney, Agent, or Firm—John F. Jones

[57] ABSTRACT

The preparation of a homogeneous solution of a polyol having Formula I or II or mixtures thereof

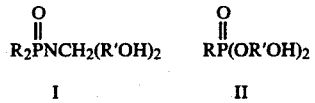

wherein R represents a saturated or unsaturated alkyl group having from 1 to 20 carbon atoms, a saturated or unsaturated alkaryl group having from 7 to 20 carbon atoms, or an aryl group having from 6 to 12 carbon atoms and R' independently represent an alkylene group having from 1 to 4 carbon atoms or an alkylene ether group having from 2 to 50 carbon atoms with an esterol which is a linear oligomeric polyester backbone terminated at one end with a hydroxy group and at the other end with a vinyl group is described.

5 Claims, No Drawings

THERMOSETTING RESINOUS MOLDING COMPOSITIONS FOR PREPARING POLYURETHANE CONTAINING A PHOSPHOROUS POLYOL AND AN ESTEROL

This invention relates to improved polymerizable resinous condensates and the thermosetting products thereof and more particularly pertains to compositions composed of an oligomeric unsaturated methacrylate monool and alkyl or aryl phosphonate or phosphonic ester material, such as dialkyl bis(hydroxyalkyl) aminomethyl phosphonate, and to improved polyurethane materials prepared therefrom by reaction of these products with polyisocyanates.

The present invention represents an improvement on the invention relating to oligomeric hydroxy alkyl (unsaturated ester) methacrylates and their reaction products with polyisocyanates and the resulting thermoset polymers which are more fully described in U.S. Pat. No. 4,374,229 which is incorporated herein by reference.

The oligomeric hydroxy alkyl(unsaturated ester) methacrylates described in U.S. Pat. No. 4,374,229 are useful reactive monomers which can be used in reaction injection molding (RIM) sheet molding compositions and applications because of their unique simultaneous or sequential reactions via their hydroxyl groups with polyisocyanates as well as by the free radical catalyzed polymerization through the multiple olefinic bonds which are also present in them. The hydroxy alkyl (unsaturated ester) methacrylate resins obtained by using the manufacturing process described in U.S. Pat. No. 4,374,229 is mostly hazy and a solid often slowly precipitates from them on prolonged standing at room temperature and also at elevated temperatures. This haziness and precipitation sometimes can cause problems in handling, processing and also sometimes results in non-homogeneous solutions which might show inconsistent rates of polymerization in the various applications of such materials in polyurethane systems.

I have discovered that the inclusion of polyols (from about 1 to 30% by weight) containing alkyl or aryl phosphonate, phosphonic ester, phosphonamides and the like in the oligomers described in U.S. Pat. No. 4,374,229 results in homogeneous and stable resin solutions which have long shelf life at both room temperature and at elevated temperatures. These improved mixtures also show improved and consistent chemical reactivity towards polyisocyanates and produce thermoset polyurethane polymers in accordance with procedures more fully described in U.S. Pat. No. 4,374,229 which have improved fire retardant properties.

The saturated or unsaturated alkyl or aryl phosphonate ester polyol additive of this invention can be synthesized by the reaction of alkylene oxides or bicyclic amide acetals with the corresponding saturated or unsaturated alkyl or aryl phosphonic acid. Products of this type which are useful in the present invention include those which conform to the formulas I or II

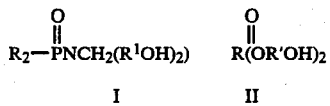

wherein R represents a saturated or unsaturated alkyl group having from 1 to 20 carbon atoms, a saturated or unsaturated alkaryl group having from 7 to 20 carbon atoms, or an aryl group having from 6 to 12 carbon atoms and R' represents an alkylene group having from 1 to 4 carbon atoms or an alkylene ether group having from 2 to 50 carbon atoms.

The hydroxy alkyl (unsaturated ester) methacrylate component in accordance with U.S. Pat. No. 4,374,229 is in the form of a linear oligomeric polyester backbone terminiated at one end with a hydroxy group and at the other end with a vinyl group. These products, also sometimes called esterols, can conveniently be prepared by the catalytically induced addition or condensation of a lower alkylene oxide with a dicarboxylic acid anhydride in the presence of a mono-carboxylic acid containing vinyl unsaturation such as methacrylic acid or acrylic acid.

The vinyl unsaturated carboxylic acid serves to supply a terminal polymerizable vinyl group to the esterol and ultimately determines the molecular weight of the esterol.

In preparing the esterols, any of the $C_2$–$C_4$ alkylene oxides or mixtures thereof can be used. Propylene oxide, however represent the preferred reactant. Maleic anhydride is used exclusively or as a major portion of the acid anhydride component. A variety of other dibasic acid anhydrides can be used in combination with the maleic anhydride in the practice of such an embodiment. Representative of the former anhydrides include phthalic, succinic, chlorendic, itaconic as well as substituted derivatives thereof.

As indicated above, maleic anhydride is use exclusively or as a major portion of the diacid anhydride component in the formulation of the esterol. The maleic residues of the resultant esterol may be completely isomerized to fumarate residues. This can be readily accomplished in the presence of an isomerization catalyst at temperatures which do not adversely affect the terminal vinyl group provided the esterol does not exhibit an acid value in excess of about 3 and more preferably not in excess of 1.

In the preparation of thermoset polyurethanes it is desirable to first effect coupling of the esterol mixture with a polyisocyanate prior to copolymerizing with a crosslinking agent. The coupling reaction can be carried out at a temperature between about 40 degrees C. and 90 degrees C. in a suitable organic solvent for the reactants. Likewise, a crosslinking agent, e.g., styrene, when employed in practicing the invention can serve as the solvent. The polyisocyanate and esterol mixture are combined in the coupling reaction to provide an NCO-/OH equivalent ratio value of from 0.8:1 to 1.2:1 and more preferably in the ratio of about 1:1, respectively.

Suitable polyisocyanates useful in this invention include organic isocyanates having at least two isocyanate groups per molecule. The polyisocyanates can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methylene phenylene-2,4-diisocyanate, naphthalene-1,4-diisocyanate, toluene diisocyanate, diphenyl-4,4'-diisocyanate, benzene-1,2,4-triisocyanate, xylene-1,4diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two, more fully disclosed in U.S. Pat. Nos. 3,350,362 and 3,382,215. Polyisocyanates which are polymeric in nature including isocyanate prepolymers of all types are included in this invention.

Suitable cross linking agents for the purposes of this invention include a variety of vinyl and allyl monomers. Representative monomers are such as styrene, vinyl toluene, methyl acrylate, methyl methacrylate, vinyl acetate, vinyl chloride, divinyl benzene, diallyl phthalate, diallyl isophthalate, triallylcyanurate, alpha-methyl styrene, tertiary butyl styrene, triallylisocyanurate, ethylene glycol diacrylate and the like. The ratio of the esterol mixture to the monomeric crosslinking agent can be varied widely over the range of from 99–20 parts by weight of the former and correspondingly from 1 to 80 parts of the crosslinking agent. Conventional initiators and promoters are applicable in effecting the copolymerization reaction. As previously indicated, the coupled esterol mixture compositions of this invention are especially amenable for use in deriving thermoset molded products in accordance with a RIM type of operation.

The RIM process usually involves the generation of two reactive streams. In one stream the esterol mixture is combined with a suitable catalyst, e.g., a tin salt and optionally an amine promoter. In the other stream, the polyisocyanate is combined with a suitable crosslinking agent in the presence of a free radical catalyst. The two streams are admixed to provide an instantaneously reactable system which is immediately pump-injected into a mold where the completion of the reaction occurs and is evidenced by a peak exotherm occurring within several minutes, whereupon the molded object is discharged from the mold.

As stated above, the amount of phosphorous derived hydroxyl containing additives of this invention in their mixtures with the esterol or hydroxy alkyl (unsaturated ester) methacrylate can be in the range of from 1 to 30% by weight and preferably from about 1 to about 10% by weight based on the weight of the esterol. Because the additives of this invention also contain hydroxyl groups capable of reaction with the polyisocyanates, their mixtures with the esterols of U.S. Pat. No. 4,374,229 when reacted with polyisocyanates involves reaction of the hydroxyl groups of the additives as well as those of the esterols in the formation of polyurethane products. Thus the equivalent amount of the polyisocyanate can be in the range of from about 0.85 to 3.0 equivalents per the combined hydroxy equivalents in the additive-esterol mixture. The use of fillers, reinforcing fibers, colorants, plasticizers, reactive diluents, such as polyols and the like in the compositions of this invention is within the scope of the invention.

This invention is further illustrated in the following illustrative examples.

EXAMPLE 1

An oligomeric hydroxy alkyl (unsaturated ester) methacrylate resin was prepared according to Example I of U.S. Pat. No. 4,374,229. The viscous liquid product was found to have the following properties: hydroxy number of 182, acid value of 0.28, viscosity of 520 cps at 77° F., and 0.02% of water. To this resin was added the compounds indicated in Table 1 and the resulting solutions were warmed at 60 degrees C. for 2–4 hours. The samples were then cooled to room temperature and the clarity was observed for one week. The results are given in the Table. In the Table additive A was one of formula I wherein R is ethyl and R' is $C_2H_4$, additive B is one of formula II wherein R is $CH_2{=}CCH_3$ and R' is $C_3H_6$ and $C_6H_{12}$, and additive C is one of formula II wherein R is $CH_2{=}CCH_3$ and R' is $CH_2CH_2NH(COCH_3)CH_2CH_2$.

TABLE 1

| Sample # | Additive Based on Oligomers (% Wt.) | Appearance | Viscosity (cps) |
|---|---|---|---|
| 1 | None | Cloudy, some ppt at bottom | 530 |
| 2 | A (4%) | Clear, no ppt | 520 |
| 3 | A (6%) | Clear, no ppt | 510 |
| 4 | B (3%) | Clear, no ppt | 530 |
| 5 | B (5%) | Clear, no ppt | 540 |
| 6 | C (6%) | Clear, no ppt | 560 |

EXAMPLE 2

This is a comparative Example outside the scope of the present invention. To a solution of 14 g of the hydroxy alkyl (ester) methacrylate of Example 1, 0.35 g of t-butyl perbenzoate, 0.04 g of PEP 183S (a cobalt-based accelerator from Air Products Co.) and 0.02 g of dibutyltin dilaurate was added 7.0 g of carbodiimide modified liquid methylene bis(phenyl isocyanate) (NCO equivalent weight of 144). The resulting mixture was mixed rapidly to give gellation in about 60 seconds.

EXAMPLE 3

A solution of 14 g of the hydroxy alkyl ester methacrylate of Example 1 with 4% by weight of diethyl bis(2-hydroxyethyl) amino methyl phosphonate was mixed with 0.35 g of t-butyl perbenzoate, 0.04 g of PEP 183S and 0.02 g of dibutyl tin dilaurate and the mixture was allowed to react with 7 g of the polyisocyanate described in Example 2. Gelation occurred within 48 seconds after mixing to give a solid polymer. This demonstrated that the addition of small amounts of the additive of this invention results in improving the rate of reaction of the esterol with polyisocyanates.

EXAMPLE 4

The procedure of Example 2 was followed using the 14 g solution of the hydroxy alkyl 6% diethyl bis(2-hydroxy ethyl) amino methyl phosphonate, 0.35 g of t-butyl perbenzoate, 0.04 g of PEP 183S, 0.02 g of dibutyltin laurate and 7 g of the polyisocyanate. Polymerization occurred rapidly to give a gel time of 45 seconds.

I claim:
1. The homogeneous, stable solution produced by mixing from 1 to 30% by weight of a polyol conforming to at least one of the formulas

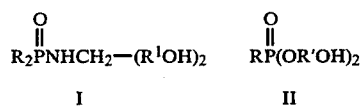

wherein R represents a saturated or unsaturated alkyl group having from 1 to 20 carbon atoms, a saturated or unsaturated alkaryl group having from 7 to 20 carbon atoms, or an aryl group having from 6 to 12 carbon atoms and R' independently represent an alkylene group having from 1 to 4 carbon atoms or an alkylene ether group having from 2 to 50 carbon atoms with an esterol.

2. The solution of claim 1 wherein the esterol is a linear oligomeric polyester backbone terminated at one end with a hydroxy group and at the other end with a vinyl group.

3. The solution of claim 2 wherein the polyol is one of Formula I wherein R is ethyl and R' is $C_2H_4$.

4. The solution of claim 2 wherein the polyol is one of Formula II wherein R is $CH_2=CCH_3$ and R' is $CH_2CH_2NH(COCH_3)CH_2CH_2$.

5. The process for preparing a polyurethane comprising reacting a solution according to claim 1 with a polyisocyanate.